(12) United States Patent
Mareau et al.

(10) Patent No.: US 11,035,262 B2
(45) Date of Patent: Jun. 15, 2021

(54) INTERNALLY COOLED POPPET VALVE FOR INTERNAL COMBUSTION ENGINE

(71) Applicant: FEDERAL-MOGUL VALVETRAIN GMBH, Barsinghausen (DE)

(72) Inventors: Andre Mareau, Strasbourg (FR); Stefan Kellermann, Barsinghausen (DE); Antonius Wolking, Barsinghausen (DE); Oliver Schulze, Donaueschingen (DE); Andreas Heinek, Bannewitz (DE); Guido Bayard, Dortmund (DE); Daniel Eisenring, Blumberg (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 0 days.

(21) Appl. No.: 16/487,593

(22) PCT Filed: Feb. 21, 2017

(86) PCT No.: PCT/EP2017/053888
§ 371 (c)(1),
(2) Date: Aug. 21, 2019

(87) PCT Pub. No.: WO2018/153428
PCT Pub. Date: Aug. 30, 2018

(65) Prior Publication Data
US 2020/0056516 A1    Feb. 20, 2020

(51) Int. Cl.
*F01L 3/14* (2006.01)
*F01L 3/20* (2006.01)
(Continued)

(52) U.S. Cl.
CPC  *F01L 3/18* (2013.01); *F01L 3/20* (2013.01); *F01P 5/10* (2013.01); *F16K 49/007* (2013.01)

(58) Field of Classification Search
CPC ...... F02M 26/66; F01L 3/14; F01L 2820/045; F01L 3/00; F01L 3/06; F01L 3/12;
(Continued)

(56) References Cited

U.S. PATENT DOCUMENTS

| 1,343,111 A | 6/1920 | Cattaneo |
| 2,238,628 A * | 4/1941 | Daisley ................. F01L 3/14 |
| | | 123/188.3 |

(Continued)

FOREIGN PATENT DOCUMENTS

| CH | 228281 A | 8/1943 | |
| JP | S485106 U | 1/1973 | |
| WO | WO-2008029426 A1 * | 3/2008 | ............... F01C 3/04 |

*Primary Examiner* — Long T Tran
(74) *Attorney, Agent, or Firm* — Robert L. Stearns; Dickinson Wright, PLLC

(57) ABSTRACT

A poppet valve (2) with a valve body (4) has a cavity (6), a coolant inlet port (8). A coolant outlet port (10). The coolant inlet port (8) and the coolant outlet port (10) are arranged on a valve stem (12) of the poppet valve (2). The cavity (6) extends into the valve stem (12) of the poppet valve (2) and into a valve head (14) of the poppet valve (2), wherein there is provided a coolant conducting element (16) within the cavity (6) and extending into the cavity (6) from the valve head (14) to the valve stem (12), where the coolant conducting element (16) in each case has a cross-section. The coolant conducting element (16) includes a pipe section (18) and a funnel section (20), and the coolant conducting element (16) extends concentrically to the poppet valve (2) in the cavity (6) of the poppet valve (2).

11 Claims, 4 Drawing Sheets

(51) Int. Cl.
*F01L 3/18* (2006.01)
*F01P 5/10* (2006.01)
*F16K 49/00* (2006.01)

(58) Field of Classification Search
CPC ........ F16K 27/02; F16K 1/00; F16K 31/0624;
F16K 31/0655; F16K 31/52408
See application file for complete search history.

(56) References Cited

U.S. PATENT DOCUMENTS

| | | | | |
|---|---|---|---|---|
| 2,371,548 | A * | 3/1945 | Saffady | F01L 3/14 |
| | | | | 123/41.16 |
| 3,945,356 | A * | 3/1976 | Kuhn | F01L 3/18 |
| | | | | 123/41.41 |
| 4,164,957 | A | 8/1979 | Goloff | |
| 5,168,843 | A * | 12/1992 | Franks | F01L 3/085 |
| | | | | 123/188.2 |
| 6,955,339 | B1 * | 10/2005 | Blume | F16K 1/46 |
| | | | | 251/318 |
| 8,479,692 | B2 * | 7/2013 | Ishimitsu | F01L 3/18 |
| | | | | 123/41.41 |

* cited by examiner

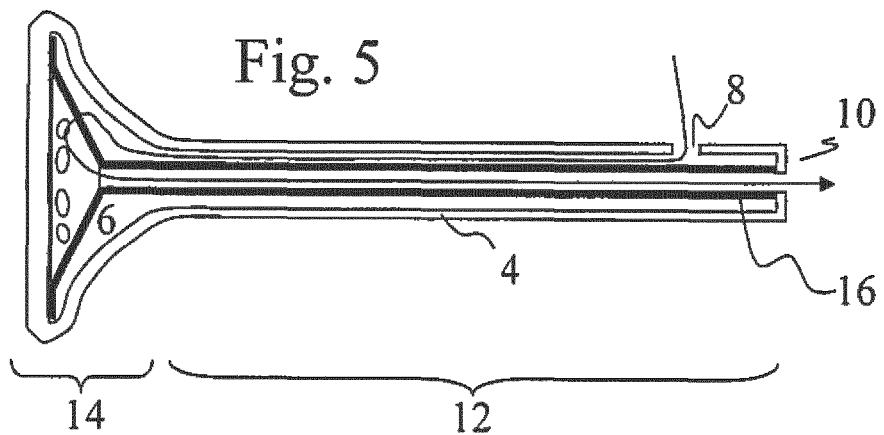
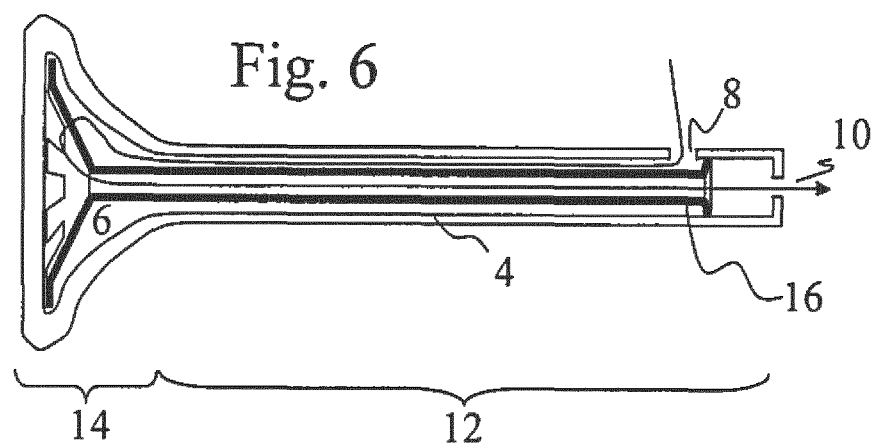
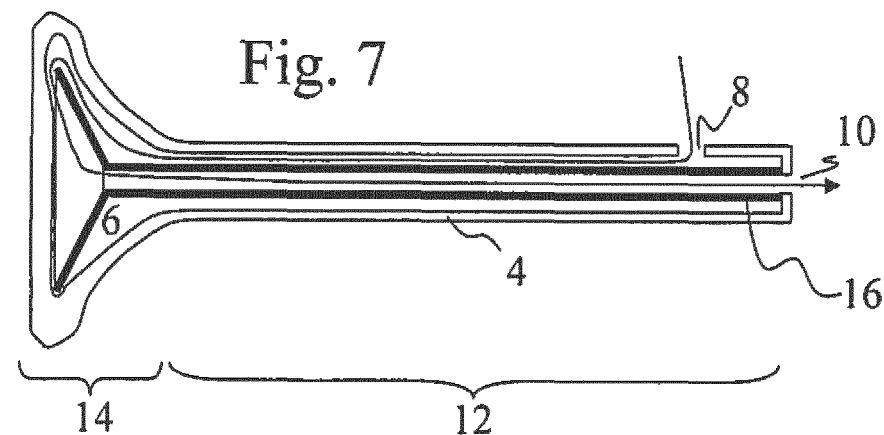

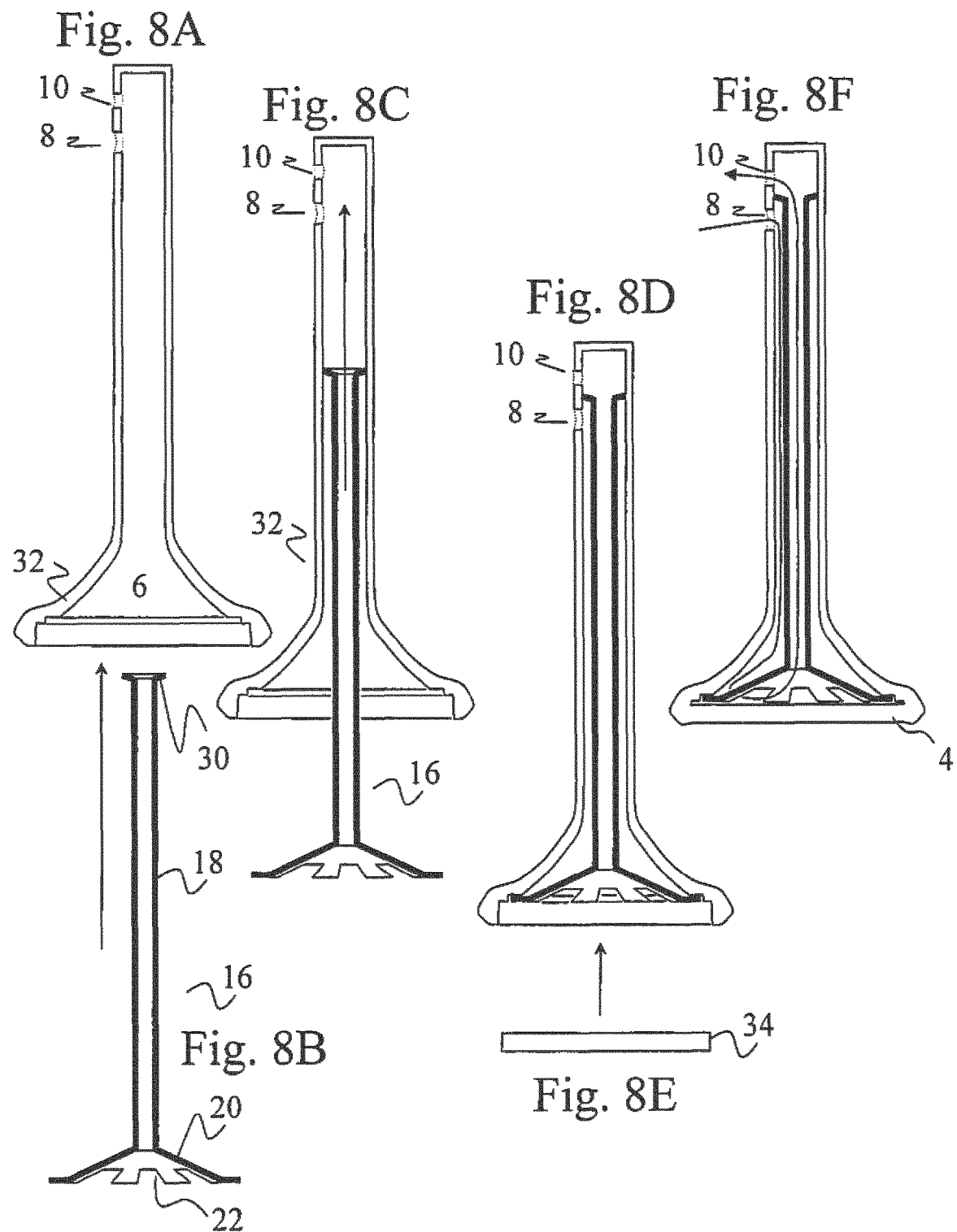

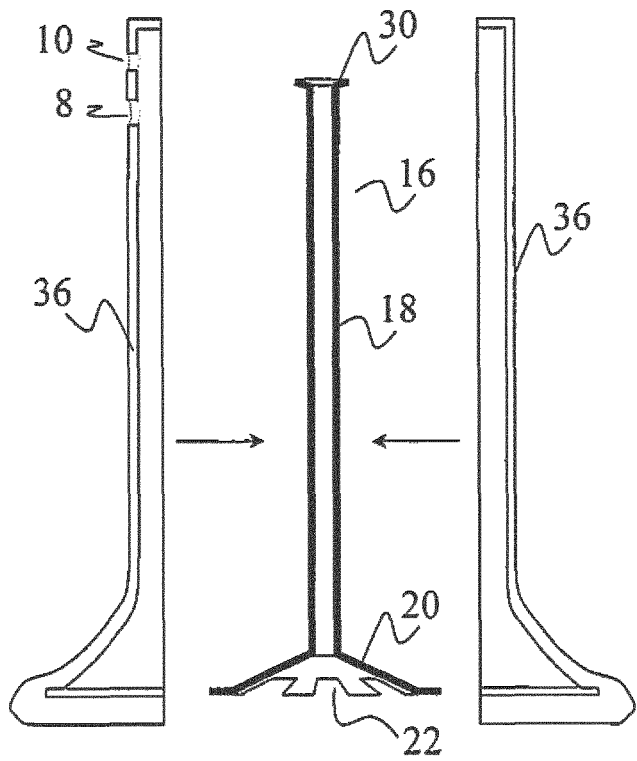
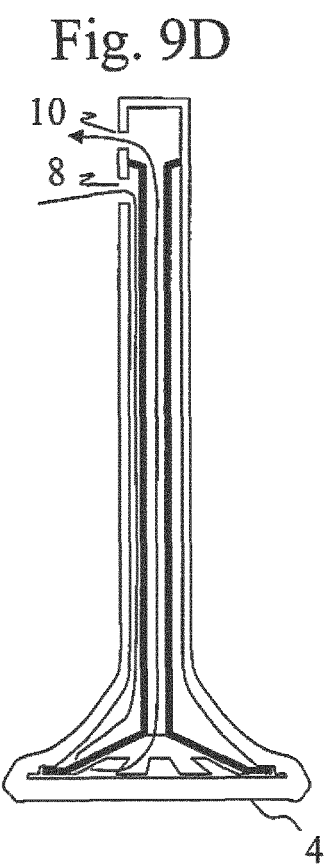

INTERNALLY COOLED POPPET VALVE FOR INTERNAL COMBUSTION ENGINE

BACKGROUND

1. Technical Field

The present invention relates to a poppet valve for a cylinder head of an internal combustion engine which is provided with a connection to an external cooling circuit. Furthermore, the present invention relates to an internally cooled poppet valve for an internal combustion engine provided with a device for directing a coolant within a poppet valve.

2. Related Art

Nowadays internally cooled poppet valves are standard in exhaust valves, especially in the case of combustion engines. Meanwhile there are internally cooled poppet valves known of in which the valve head has an enlarged cavity in order to achieve an improved "shaker cooling" method.

SUMMARY

According to a first aspect, a poppet valve is supplied with a valve body which includes a cavity, a coolant inlet port and a coolant outlet port, which in addition is provided with a coolant conducting element. The coolant inlet port and the coolant outlet port are arranged in a valve stem of the poppet Valve, preferably in the vicinity of a valve stem end of the valve. The cavity extends to a stem of the poppet valve as well as in a valve head of the poppet valve. The cavity has a larger diameter in the valve head area than in the stem area. The coolant conducting element or guiding element is positioned in the cavity. The coolant conducting element extends into the cavity from the valve head into the valve stem. The coolant conducting element is designed as a separate component, which is introduced into the cavity or is positioned in the cavity. The coolant conducting element has a circular cross-section in the axial direction at different points. The coolant conducting element includes a pipe section and a funnel section. The pipe section extends primarily into the valve stem while the funnel section extends primarily into the valve head. The coolant conducting element extends concentrically to the poppet valve or its outer surface in the cavity of the poppet valve.

The coolant conducting element preferably divides the cavity of the poppet valve, defining an inner space defined by an inner side of the pipe section, an outer space defined by the clearance between an outer surface of the pipe section and an inner surface of the cavity. The inner space preferably serves as a return flow and is preferably connected to the coolant outlet port. The outer space preferably serves as a coolant inlet and is preferably connected to the coolant inlet port. Furthermore, a connection between the outer space and the inner space is provided in the valve head or the funnel section area in order to allow a flow of coolant from the coolant inlet port over the outer space into the area of the valve head to the inner space and from there to the coolant outlet port.

The pipe section and the funnel section can present a smooth transition area or present a layer or edge at the transition area.

In a further embodiment of the poppet valve, the coolant conducting element includes recesses in or on the edge of the funnel section which form coolant channels. These funnel section coolant channels form a connection between the outer space and the inner space. The recesses are preferably arranged on a radially outer edge of the funnel section in order to improve the cooling of the valve disc.

In an additional exemplary embodiment, the cavity in the valve body has a structure which forms coolant channels around an outer edge of the funnel section. Instead of perforations or openings in the funnel section, corresponding channels can also be provided at the edge of the cavity so as to enable a coolant conducting element which is completely rotationally symmetrical.

In a further embodiment of the poppet valve, the cavity in the valve body shows at least one layer in a valve stem end. This layer can reduce a diameter of the cavity to the valve end in order to include a free end of the tube section and thus substantially achieve the separation of the inner space from the outer space in the area of the valve stem end. Through this layer the structure of the coolant conducting element can be simplified so that no precautions have to be taken to centre the coolant conducting element in the valve stem or to achieve the separation of the outer space and the inner space on the coolant conducting element around the coolant openings. The layer should be selected in such a way that an outer surface of the coolant conducting element fits closely against an inner surface of the cavity in the area of the valve stem end.

In a further embodiment of the poppet valve, the coolant outlet port is arranged axially on a valve stem end of the valve. By means of an embodiment of this type, at least one cross bore in the valve stem can be dispensed with. Furthermore, tappets can be used to additionally connect a cooling circuit to the valve end.

In a further embodiment of the poppet valve, the coolant conducting element is provided with a further centring and sealing funnel section at a valve stem-side end. The funnel section serves in this case to align the coolant conducting element in the cavity of the poppet valve and to form a barrier between the coolant inlet port and the coolant outlet port. The centring and sealing cone section should hold, seal and centre the free end of the pipe section at the valve stem end.

In a further embodiment of the poppet valve, an axial distance between the coolant inlet port and the coolant outlet port is greater than a valve lift of the installed valve. With such a structure, even with an activated valve the cooling circuit within the valve can be maintained without problems. This embodiment is used in combination with coolant openings extending transversely to the valve direction.

In an additional embodiment of the poppet valve, this is configured at least as a second-part poppet valve. In this case, a first part represents a valve body with the hollow valve stem and the hollow valve head, whereby the cavity is opened in the direction of a valve head. A second part comprises a valve cover, which closes the opening of the first valve body in the direction of the valve floor. The coolant conducting element is to be inserted into the hollow valve stem during manufacturing of the opening in the valve head.

In an additional embodiment of the poppet valve, this is configured at least as a second-part poppet valve. In this embodiment, the poppet valve is composed of at least two shells, which are connected by a sealed seam extending in an axial direction. The sealed seam is strictly located at a level at which the valve axis is also located.

According to a further aspect, a cylinder head with at least one poppet valve as described above is provided. The cylinder head includes further cooling pipes which are connected to the coolant inlet port and the coolant outlet port of the, at the very least, one valve.

According to an additional aspect, an engine is provided with the aforementioned cylinder head. The cooling pipes are part of the engine cooling circuit, which further includes at least one coolant pump.

THE DRAWINGS

In the following, embodiments are is illustrated based on schematic, non-dimensional figures. In the following, all figures are shown as sectional views.

FIGS. 5 to 7 show embodiments in which a coolant conducting element is held in the cavity by means of a tight fit.

FIGS. 8A to 9D illustrate how a poppet valve can be manufactured.

DETAILED DESCRIPTION

Figure 1:
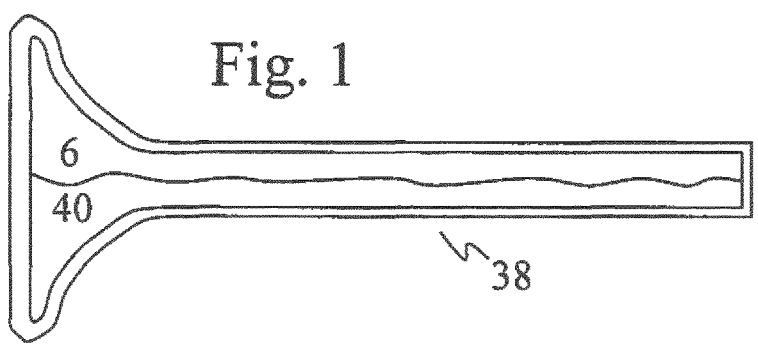
FIG. 1 shows a conventional internally cooled valve.

Both the description and figures use the same or similar reference numerals to refer to identical or similar elements or components.

FIG. 1 shows a conventional internally cooled valve 38 with a cavity in which a coolant such as sodium 40 can move to enable so-called "shaker cooling" of the valve head via a valve stem cooled in the cylinder head.

Figure 2:
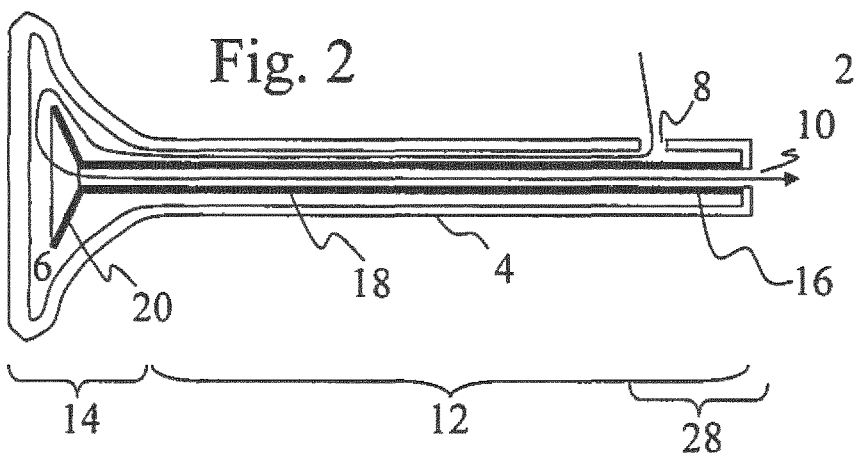
FIGS. 2 to 4 show an embodiment of an externally cooled valve, which can be connected to an external cooling circuit.

FIG. 2 shows a first embodiment of an externally cooled valve 2 according to the invention. The valve 2 includes a valve body 4 with a valve head 14 and a valve stem 12 as well as a valve stem end 28. A cavity 6, which is connected to a coolant inlet port 8 and a coolant outlet port 10, is located in the valve body 4. The coolant inlet port 8 and a coolant outlet port 10 are arranged at the valve stem end 26. The coolant inlet port 8 is vertical to the valve axis and the coolant outlet port 10 is coaxial to the valve axis. A coolant conducting element 16 is arranged in the cavity, which conducts a coolant flow from the coolant inlet port 8 via the valve head z of a coolant outlet port 10.

The coolant conducting element 16 is only connected here to the valve stem end 26. The coolant conducting element 16 includes a pipe section 18 and a funnel section 20, which direct the coolant flow to the edge of the poppet valve of the valve head 14. According to this structure, the cooling of the valve head 14 can be improved. Furthermore, the cooling capacity can be considerably increased by means of a flowing coolant.

Figure 3:
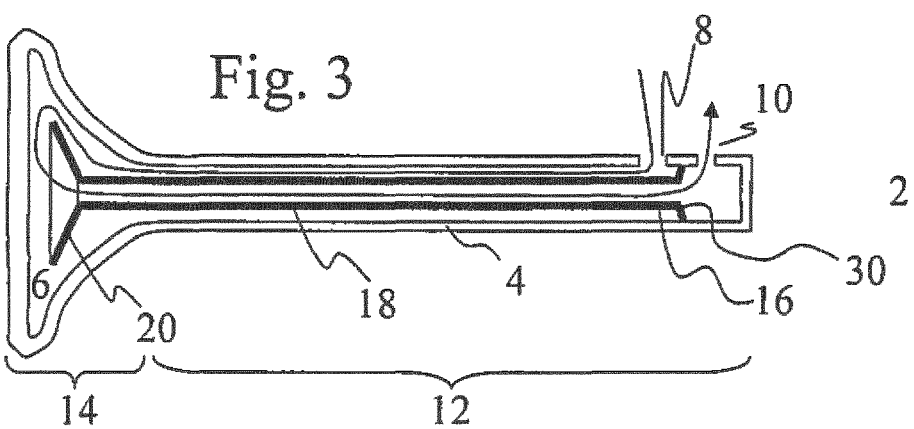

FIG. 3 shows a further embodiment of an externally cooled valve according to the invention. FIG. 3 differs from FIG. 2 in that both the coolant inlet port 8 and the coolant outlet port 10 lie perpendicular to the valve axis. For this purpose, the coolant conducting element 16 is provided with a further funnel section 30, with which the coolant conducting element 16 is fastened to the valve stem.

Figure 4:
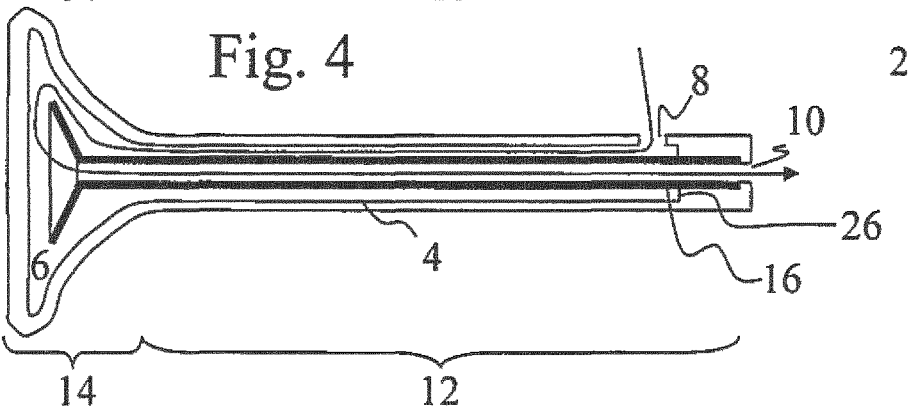

FIG. 4 shows another embodiment of an externally cooled valve according to the invention. This embodiment essentially corresponds to the embodiment of FIG. 2, in which the cavity 6 shows a layer 26 in the valve stem. Here the coolant conducting element 16 is connected to the pipe section 18 with the valve stem end.

In FIGS. 2 to 4, the connection of the coolant conducting element 16 to the end 28 of the valve shaft 12 has been described in detail. In the embodiments, it is merely shown that a coolant flow can be directed around the funnel section 20.

The following FIGS. 5 to 7 illustrate various possibilities as to how the funnel section 20 can be designed in order to enable a coolant flow.

In FIG. 5, a valve stem, as already described in FIG. 2, has been combined with a coolant conducting element 16, the funnel section 20 of which is positively held on the valve head 14 in the cavity 6. In the funnel section 20, recesses 22 are provided in the form of holes or through-holes in order to enable a coolant flow.

FIG. 6 shows a valve stem, as already described in FIG. 3, wherein an axially arranged coolant outlet port 10 is provided. The coolant conducting element 16 also has a funnel section 20 here, which is positively held on the valve head 14 in the cavity 6. In the funnel section 20 recesses 22 are provided in the form of grooves or notches, which in this case allow the coolant flow.

In FIGS. 5 and 6 it is shown that the coolant passes through the funnel section 20 in order to reach the inside of the pipe section 18 from an outer side of the cavity or coolant conducting element 16.

In FIG. 7, a valve stem is the same as in FIG. 5. Here, the coolant conducting element 16 has a funnel section 20 with no openings or recesses, which is also positively held on the valve head 14 in the cavity 6. Here, channels in the valve body 4, which allow the coolant flow, are now provided in the area of the cavity 6 at the point where the edge of the funnel section is held. This requires a further machined valve body 4, but at the same time allows for a completely rotationally symmetrical coolant conducting element 16.

The previous representations have merely shown the desired end product but have not shown how it can be produced.

FIGS. 8A to 8F show a potential manufacturing method.

FIG. 8A shows a valve body with an open valve base 32, which serves as an output semi-finished product. The valve body 32 corresponds to that shown, for example, in FIG. 3

FIG. 8B shows a coolant conducting element 16, as has already been described in FIG. 6.

FIG. 8C shows how the coolant conducting element 16 of FIG. 8B is inserted into the valve body with the valve base 32 of FIG. 8A through the opening in the valve base.

In FIG. 8D, the coolant conducting element 16 is pushed completely into the valve body with the open valve base 32.

FIG. 8E shows a valve cover 34 with which the open valve base of the valve body can be closed with the open valve base 32.

In FIG. 8F, the valve cover 34 has been sealed to the previously open valve base of the valve body. With the exception of the slightly differently designed valve stem end, this valve corresponds to the valve of FIG. 6.

FIGS. 9A to 9D show another potential manufacturing method.

FIG. 9A shows a valve half-shell 36, which is provided with coolant ports 8 and 10. The valve half shell 36 corresponds in form to a conventional internally cooled valve in an axial direction; the specialist must understand that it is of less importance to the present invention how the valve half-shell 36 is made, e.g. by casting, forging, pulling, pressing or drop forging.

FIG. 9B shows a coolant conducting element 16, as is already known in FIG. 6 and FIG. 8B.

FIG. 9C shows a similar valve half-shell 36 as that of FIG. 9A, which may or may not be provided with coolant ports 8 and 10.

The three elements of FIGS. 9A to 9C are assembled and at the very least the two valve half-shells are sealed together along their contact surface. Additional post-production work may be necessary.

It should be clear that various aspects of the present invention have been described in terms of individual embodiments in order to avoid unnecessary repetitions and redundant representations of the same or very similar situations. It is emphasised here that all components and aspects, in particular the design of the valve stem end and the fastening of the coolant conducting element at this stage along with other aspects of the shaping of the funnel sections, the cooling channels or the recesses, should be regarded as disclosed

The invention claimed is:

1. A poppet valve comprising a valve body having a cavity, a coolant inlet port, and a coolant outlet port-arranged on a valve stem of the valve body and further including a valve head of the valve body;
   a coolant conducting element disposed within the cavity and extending from the valve head into the valve stem, wherein the coolant conducting element has a tubular cross-section and includes a tubular pipe section and a funnel section,
   wherein the coolant conducing element extends concentrically to the valve body in the cavity, and
   wherein the valve body includes two separately formed valve half-shells having facing contact surfaces extending axially along the length of the valve head and valve stem and including a seal uniting the contact surfaces.

2. The poppet valve according to claim 1, wherein the coolant conducting element has a recesses on the funnel section or on an edge of the funnel section, which form coolant channels.

3. The poppet valve according to claim 1, wherein the cavity in the valve body has a structure which forms coolant channels around an outer edge of the funnel section.

4. The poppet valve according to claim 1, wherein the valve body has at least one layer at the valve stem end.

5. The poppet valve according to claim 1, wherein a coolant outlet port is arranged axially on a valve stem end.

6. The poppet valve according to claim 1, wherein the coolant conducting element has a further funnel section at a valve stem-side end.

7. The poppet valve according to claim 1, wherein an axial distance between the coolant inlet port and the coolant outlet port is greater than a valve lift of the installed valve.

8. A cylinder head having at least one poppet valve according to claim 1, including further coolant pipes connected to the coolant inlet port and the coolant outlet port of the at least, one valve.

9. An engine with a cylinder head according to claim 8, wherein the coolant pipes are part of a cooling circuit which further includes at least one coolant pump.

10. The poppet valve according to claim 1, wherein the coolant inlet and coolant outlet ports are axially spaced from a free end of the valve stem and from one another.

11. The poppet valve according to claim 10, wherein the tubular pipe section engages an inner wall of the valve stem axially between the inlet and outlet ports such that coolant entering the cavity through the inlet port is forced to pass through the pipe section before exiting the outlet port.

* * * * *